US010449695B2

(12) United States Patent
Kammerl et al.

(10) Patent No.: US 10,449,695 B2
(45) Date of Patent: Oct. 22, 2019

(54) APPARATUS FOR HEATING PLASTIC PREFORMS BY MEANS OF MICROWAVES

(71) Applicant: KRONES AG, Neutraubling (DE)

(72) Inventors: Martin Kammerl, Regenstauf (DE); Andreas Kursawe, Straubing (DE); Konrad Senn, Regensburg (DE); Johann Zimmerer, Bernhardswald (DE)

(73) Assignee: KRONES AG, Neutraubling (DE)

( * ) Notice: Subject to any disclaimer, the term of this patent is extended or adjusted under 35 U.S.C. 154(b) by 492 days.

(21) Appl. No.: 15/095,556

(22) Filed: Apr. 11, 2016

(65) Prior Publication Data
US 2016/0303769 A1 Oct. 20, 2016

(30) Foreign Application Priority Data

Apr. 17, 2015 (DE) .......................... 10 2015 105 925

(51) Int. Cl.
*B29B 13/08* (2006.01)
*H05B 6/66* (2006.01)
*H05B 6/80* (2006.01)
*F27D 99/00* (2010.01)
*H05B 6/64* (2006.01)

(52) U.S. Cl.
CPC .......... *B29B 13/08* (2013.01); *F27D 99/0006* (2013.01); *H05B 6/64* (2013.01); *H05B 6/66* (2013.01); *H05B 6/80* (2013.01); *F27D 2099/0028* (2013.01); *H05B 2206/044* (2013.01)

(58) Field of Classification Search
None
See application file for complete search history.

(56) References Cited

U.S. PATENT DOCUMENTS 3,684,978 A * 8/1972 Otaguro ................. H01H 13/68
219/715
5,489,818 A * 2/1996 Naff ........................ G01S 7/282
315/39

(Continued)

FOREIGN PATENT DOCUMENTS

CN 101454142 A 6/2009
DE 102007022386 A1 11/2007

(Continued)

OTHER PUBLICATIONS

Chinese Office Action dated Sep. 29, 2017; Application No. 201610236026.5; Krones AG.

(Continued)

*Primary Examiner* — Monica A Huson
*Assistant Examiner* — Kelsey C Grace
(74) *Attorney, Agent, or Firm* — Schmeiser, Olsen & Watts, LLP

(57) ABSTRACT

An apparatus is provided for heating plastic preforms, having a plurality of resonator units, into which in each case plastic preforms can be introduced in order to heat the latter, having at least one microwave generating unit for generating microwaves, and having a feed device for feeding to at least one resonator unit the microwaves generated by the microwave generating unit, and having at least one rectifier unit for providing a rectified voltage. Further, at least one rectifier unit provides voltage for operating at least two resonator units.

17 Claims, 2 Drawing Sheets

(56) References Cited

U.S. PATENT DOCUMENTS

| | | |
|---|---|---|
| 2010/0052224 A1 | 3/2010 | Humele et al. |
| 2011/0084064 A1* | 4/2011 | Zimmerer ........... B29C 49/6418 219/678 |
| 2012/0061384 A1 | 3/2012 | Kasai |

FOREIGN PATENT DOCUMENTS

| | | |
|---|---|---|
| DE | 102008039375 A1 | 2/2010 |
| DE | 102010055188 A1 | 7/2012 |
| EP | 0252889 A2 | 1/1988 |
| EP | 2743057 A1 | 6/2014 |
| JP | 2004200119 A | 7/2004 |
| WO | WO9954033 A1 | 10/1999 |

OTHER PUBLICATIONS

European Office Action dated Jan. 30, 2018; Application No. 16 65 819.0; Krones AG.
Chinese Office Action dated Dec. 6, 2018 for Application No. 2016102360265.

* cited by examiner

APPARATUS FOR HEATING PLASTIC PREFORMS BY MEANS OF MICROWAVES

CROSS-REFERENCE TO RELATED APPLICATIONS

This application claims priority to DE 10 2015 105 925.8, having a filing date of Apr. 17, 2015, the entire contents of which are hereby incorporated by reference.

FIELD OF TECHNOLOGY

The following relates to an apparatus and a method for heating plastic preforms. Such apparatuses have been known for a long time in the prior art. Usually, plastic preforms are moved into a resonator and are heated within this resonator through the application of microwaves. The plastic preforms thus heated are then further transported, for example to a stretch blow-moulding machine, in order thus to be expanded through the application of compressed air to form plastic containers, in particular plastic bottles.

BACKGROUND

Recently, a transition has been made to using microwaves to heat the plastic preforms, in addition to or instead of infrared radiation. The microwave heating devices known in the prior art usually have a plurality of heating stations which are units that are each independent of one another. In order to heat the plastic preforms by means of microwaves, usually several individual process stations are operated in parallel, wherein these individual process stations are of identical construction and can also be operated independently of one another. Several apparatus parts are provided for generating the microwave radiation, such as in particular a high voltage generator, a magnetron, a waveguide for transmitting the microwaves and an applicator or resonator within which the microwaves are applied to the plastic preforms. The microwave generator usually has functional groups such as a rectifier and a high voltage cascade. This high voltage cascade generates a high voltage from DC voltage. Usually, first a mains voltage is rectified and then high voltage is in turn generated by means of said high voltage cascade. The necessary components, such as the generator, the magnetron, the waveguide and the applicator, each being of low power, are therefore installed in each individual station and are operated in parallel. A large number of functional groups is thus necessary, as a result of which on the one hand the costs are increased and on the other hand the results are sometimes unsatisfactory.

SUMMARY

An aspect relates to reducing the costs in the case of such heating devices and optionally also to increase the reliability of the system.

An apparatus according to embodiments of the invention for heating plastic preforms has a plurality of resonator units, into which in each case plastic preforms can be introduced in order to heat the latter. The apparatus further has a microwave generating unit for generating microwaves, and a feed device for feeding to at least one resonator unit the microwaves generated by the microwave generating unit. The apparatus further has at least one rectifier unit for providing a rectified voltage.

According to embodiments of the invention, at least one rectifier unit provides voltage for operating at least two resonator units. Preferably, therefore, the number of rectifier units of the apparatus is smaller than the number of resonator units. It is possible that this rectifier unit provides all of the voltage for operation purposes. However, it would also be possible that the rectifier unit provides only part of the voltage, for instance half of the voltage. Therefore, for example, two or several rectifier units could be provided, which each provide partial voltages for operating several resonator units. In general, n rectifier units could be provided for example, which each deliver an $n^{th}$ of the voltage, wherein this voltage serves for supplying m resonator units and m>n.

It is therefore proposed in the context of the invention that one particular unit of embodiments of the invention, namely a rectifier unit which rectifies the mains voltage, is provided for operating several resonator units. A rectified voltage will be understood here to mean not necessarily a fully rectified and smoothed voltage; it may also be sufficient if the rectified voltage is rectified at least in comparison to an AC voltage or the mains voltage, wherein potential fluctuations of the voltage may also be encompassed.

The feed device described above, which feeds the microwaves to the resonator units, may in particular be a waveguide into which for example microwaves are fed from a microwave generating unit, such as for instance a magnetron, and which forwards these microwaves to the resonator. Advantageously, at least one and preferably exactly one waveguide is assigned to each resonator unit. It would be possible in this case that at least one tuning element, for example a tuning pin, is arranged on and/or in this waveguide and can be pushed into this waveguide in order in this way to regulate the power.

It is therefore proposed that the rectifier part of a microwave generator is removed from the individual microwave generators and the DC voltage for these is generated centrally. In this way, a common intermediate circuit for supplying several resonator units can be provided. In this case, it is possible that the rectifier unit is arranged in a stationary manner and thus the rectified voltage is transmitted to the movable resonator unit (more specifically to the high voltage generating unit and from the latter to the microwave generating unit and from the latter in turn to the resonator unit), for example by means of a slip ring.

However, it would also be possible that the rectifier unit is arranged on a moving part, for example a rotating part. In this case, the mains voltage to be fed to the rectifier unit is transmitted via the slip ring.

If, as mentioned, the rectifier unit is arranged in a fixed or stationary manner respectively, it is possible that the rectified voltage or the intermediate circuit voltage is transmitted via a slip ring to a movable part, for example a rotating part. It is generally conceivable that the individual resonator units are configured in a movable manner, for example are arranged on a movable and in particular rotatable carrier. However, it would also be possible that the resonator units themselves are also arranged in a stationary manner. Thus, for example, the individual plastic preforms could in each case be pushed through stationary resonator units and in this respect heated in the process.

By using a central rectifier unit, a saving can be made in terms of installation space and the production costs of the individual stations can be reduced. It is possible that one rectifier unit supplies at least two resonator units; however, it would also be possible that one rectifier unit supplies DC voltage to several and for example even all the resonator units that are present.

Depending on the machine concept, the central rectifier unit and the power thereof can be selected to be smaller than the sum of the installed station powers. If not all resonator units or stations are operated simultaneously, only the power corresponding to the number of microwave stations to be operated simultaneously need be provided in the intermediate circuit. If, for example, a rotary machine having a treatment angle of 270° is provided, only 75% of the installed (summed) station power need be provided in the intermediate circuit.

The generators of the individual stations convert the intermediate circuit voltage into high voltage, which is then forwarded to the microwave generating device, for example the magnetron. The magnetron generates the microwave radiation which is transmitted preferably via the abovementioned microwave guide or the feed device into the applicator, that is to say the resonator, and from the latter onto the plastic preforms.

In a further advantageous embodiment, the apparatus has a transport device (also referred to as a movement device) for introducing the plastic preforms into the resonator units and/or for taking the plastic preforms out of the resonator units.

It is possible that this transport device pushes the plastic preforms along their longitudinal direction into the resonator. However, a movement of the plastic preforms perpendicular to their longitudinal direction for the purpose of introduction into the resonator would also be conceivable. It is possible that the transport device introduces the plastic preforms into the resonator in one direction and takes them back out of the resonator in the opposite direction.

In a further advantageous embodiment, there is provided in each of the resonator devices a base reflector device which reflects microwave radiation onto the base regions of the plastic preforms.

In addition, it is also possible that the transport device has a rotating device which brings about a rotation of the plastic preforms about their longitudinal axis. In this way, a uniform heating of the plastic preforms in relation to their circumferential direction is possible. In this case, it is possible that this rotating device rotates the plastic preforms at speeds of, for example, between 20 and 200 rpm.

In a further advantageous embodiment, the apparatus has at least one high voltage source (also referred to as a high voltage generating unit) for generating high voltage or for operating a generator of high voltage. In this case, it is particularly preferred that this high voltage source is supplied with voltage by the rectifier unit. In this way, first the mains voltage is rectified and/or smoothed and the rectified voltage thus generated is converted into high voltage in the high voltage generating device. More specifically, the rectified voltage is fed to the high voltage generating device, wherein the rectified voltage is first converted into a high frequency AC voltage and this high frequency AC voltage is then stepped up. It is possible that one rectifier unit supplies rectified voltage to several of these high voltage devices. The high voltage thus generated is preferably in turn provided to the microwave generating unit.

In general, it is therefore possible that the high voltage generating unit is of modular construction and has a first module which first generates a high frequency AC voltage from a DC voltage or a substantially rectified voltage (that is to say a voltage which may still have certain "ripples"), and a second module which converts this high frequency AC voltage into a (likewise high frequency) high voltage.

In a further advantageous embodiment, at least one high voltage source provides high voltage for operating at least two resonator units. In this embodiment, it is proposed that not only the rectifier unit is arranged centrally, and supplies several resonator units, but also the high voltage supply. In this embodiment, therefore, it is proposed that a common high voltage generator is provided. The rectifier unit and the high voltage generator are provided centrally here, and the output thereof is distributed among the microwave sources of the individual stations. In the case of rotary machines, the high voltage generation may be installed either in the rotating part or in the stationary part. In the first case, it is the mains voltage that is transmitted via a slip ring, and in the latter case it is the high voltage.

It would also be conceivable that the high voltage generating unit is partially embodied centrally. For instance, a central high frequency generating unit could be provided which generates a high frequency voltage and then supplies a plurality of transforming units which step up the high frequency voltage and thus convert it into (high frequency) high voltage. The high voltage is preferably switched on or off in individual microwave generating devices, for example magnetrons, via suitable switching devices, and also the current flow to the individual magnetrons is controlled via suitable components on the magnetron. In the latter case, the high voltage source preferably provides a stabilized high voltage circuit, from which power is then fed in a defined manner to the individual magnetrons via power controllers.

In a further advantageous embodiment, therefore, the apparatus has a control device which controls the feeding of the high voltage to the individual microwave generating devices. This control device may in this case control or regulate the feeding of the high voltage also depending on a rotary position of a carrier on which the individual resonator units are arranged. The control and/or regulation may also take place depending on a relative position of the plastic preform with respect to the resonator unit. For example, the resonator unit in question may be switched off for as long as no plastic preform is located therein.

Also by using a central high voltage generating unit, the installation space and also the production costs of the individual stations can be reduced. Here, too, depending on the machine concept, it is possible that the central high voltage supply device is selected to be smaller than the sum of the installed station powers. If not all stations are operated simultaneously, it is also conceivable that only the power corresponding to the number of simultaneously operated microwave stations or microwave generating devices is provided by the high voltage generating device. Here, too, it would once again be possible for example, in the case of a rotary machine having a treatment angle of 270°, to provide only 75% of the installed station power as high voltage.

Here, too, the microwave generating devices may generate microwave radiation for individual stations from the provided high voltage, which microwave radiation is transmitted via a microwave guide into the applicator and from the latter onto the plastic preforms.

The high voltage generating unit may also be arranged in a stationary or movable manner.

In a further advantageous embodiment, at least one microwave generating device generates microwaves for operating at least two resonator units. In this embodiment, it is proposed that not only a common rectifier and a common high voltage supply device is provided, but also a common microwave generator, the power and microwaves of which are distributed among several resonator units. In this embodiment, therefore, the rectifier unit, the high voltage generating device and the microwave generating device are embodied centrally and the microwave radiation is distributed among the individual stations.

As mentioned above, in the case of rotary machines, the high voltage generating device may in this case be installed on the stationary part or on the rotating part. In the first case, the high voltage is transmitted via the slip ring, and in the latter case the mains voltage. Here, however, the microwave generating devices are preferably each arranged on the movable part and the central microwave generating device is arranged in a movable manner and in particular in such a way as to move jointly with the resonator units. The central microwave generating device generates from the high voltage the microwave power for the entire system. The microwave radiation to the individual stations is switched on or off via suitable switching devices. By using a central microwave generating unit, the installation space and also the production costs of the individual stations can be reduced.

Depending on the machine concept, the central microwave generating device may also be selected to be smaller than the sum of the installed station power. If not all stations are operated simultaneously, only the power corresponding to the number of microwave stations to be operated simultaneously need be provided by the microwave generating device. A rotary machine having a treatment angle of 270° need be able to provide only 75% of the installed station power as high voltage.

The individual stations are provided with microwave radiation which is transmitted via a microwave guide into the applicator and from the latter into the plastic preforms.

In a further advantageous embodiment, the apparatus has a transport device which transports the resonator units along a predefined transport path. Advantageously, this is a circular transport path. In a further advantageous embodiment, the transport device has a rotatable carrier. The individual resonator units are preferably arranged on said carrier.

In a further advantageous embodiment, to each resonator unit one of the movement devices described above is assigned, which introduces the plastic preforms into the resonator unit. This movement device may have an electric motor drive and in particular a linear motor, which brings about the movement of the plastic preforms relative to the resonator units.

In a further advantageous embodiment, the apparatus has a feed device for feeding these plastic preforms to the individual transport devices for transporting the plastic preforms. The individual devices for feeding the plastic preforms into the resonator units may each have engagement elements which are able to hold said plastic preforms. These engagement elements may be, for example, holding mandrels which are introduced into mouths of the plastic preforms.

In a further advantageous embodiment, at least one microwave generating unit is selected from a group of microwave generating units which includes magnetrons, klystrons or solid-state sources. In simplified terms, a klystron is an electron tube which uses the propagation time of the electrons to generate and to amplify high frequency radiation. In a klystron, a high voltage gives rise to a speed modulation on an accelerated electron stream. To this end, said electron stream passes through a cavity resonator, to which a high frequency signal is fed. After a given propagation time, the speed modulation gives rise to a density modulation. The modulated electron stream can be passed through one or several further cavity resonators and at the last resonator a portion of its energy can be drawn off as high frequency energy.

Embodiments of the invention also relate to a method for heating plastic preforms. The plastic preforms are introduced into resonator units and are heated within these resonator units through the application of microwaves. The microwaves are generated by means of at least one microwave generating unit, and at least one rectifier unit provides voltage for operating the at least one microwave generating unit. According to embodiments of the invention, at least one rectifier unit provides voltage for generating microwaves for at least two resonator units or for operating at least two resonator units (preferably several resonator units). Preferably, the rectifier unit provides a rectified voltage which is then converted into a (high frequency) high voltage and this high voltage is in turn fed to the microwave generating units which generate the microwaves for supplying the resonator units. It would also be possible that several rectifier units are provided, which however operate an even greater number of resonator units.

It is therefore also proposed with regard to the method that at least one rectifier unit ultimately supplies at least two and preferably several resonator units.

In a further preferred method, at least one rectifier unit supplies at least one high voltage source with voltage and this at least one high voltage source in turn supplies at least two resonator units and preferably several resonator units.

In a further advantageous embodiment, the rectifier unit provides a rectified voltage or a power which is smaller than the sum of the powers required by all resonator units.

BRIEF DESCRIPTION

Some of the embodiments will be described in detail, with reference to the following figures, wherein like designations denote like members, wherein.

DETAILED DESCRIPTION

Figure 1:
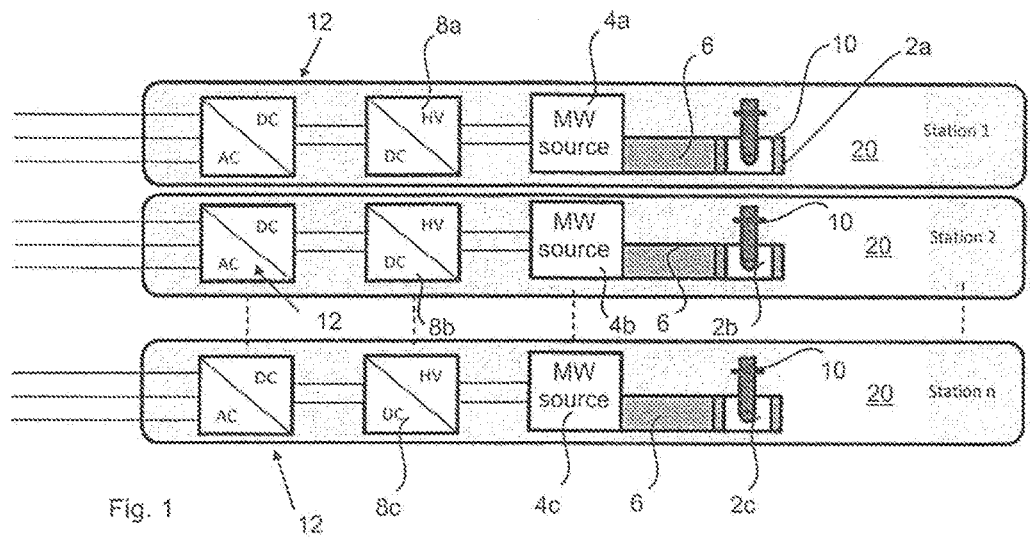
FIG. 1 shows an apparatus according to the prior art.

FIG. 1 schematically shows an apparatus 1 for heating plastic preforms 10. Here, a total of n stations 20 are provided, which are each embodied separately. Each individual station has a resonator unit 2a, 2b, 2c, which is in each case supplied with microwaves from microwave generating devices 4a, 4b, 4c via waveguides 6. Preferably, these resonator units are arranged in a movable manner. The individual stations 20 may (as also in the embodiments discussed below) be arranged on a common carrier, in particular a rotatable carrier (not shown).

Reference 12 denotes a rectifier unit which rectifies (DC) mains voltage (AC). This rectified voltage is respectively fed to high voltage sources or high voltage generating units 8a, 8b, 8c and these in turn generate high voltage HV. This high voltage is transmitted or fed to the individual microwave generating devices 4a, 4b, 4c.

Figure 2:
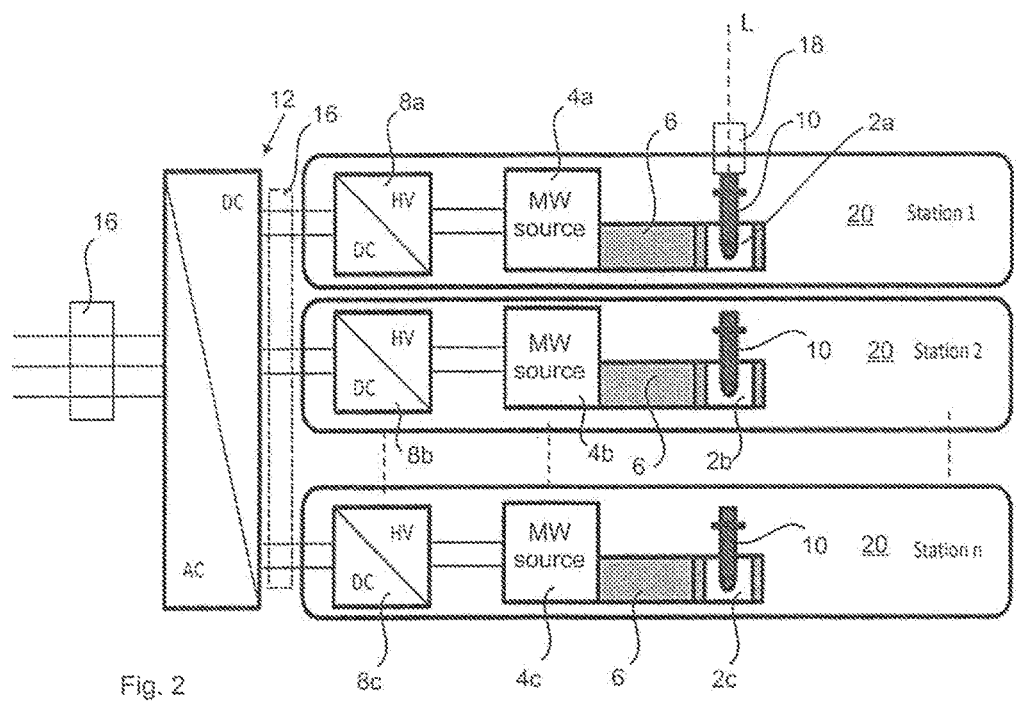
FIG. 2 shows an apparatus according to the invention in a first embodiment.

FIG. 2 shows a first embodiment of an apparatus according to embodiments of the invention. Instead of the three separate rectifier units shown in FIG. 1, here just one rectifier unit 12 is provided, which in this case supplies all the high voltage generating devices 8a, 8b and 8c with high voltage. It is possible here that the rectifier unit is arranged in a stationary manner, so that the output voltage thereof is fed to the individual high voltage sources 8a, 8b, 8c via rotary distributors (for example a slip ring). Reference 16 denotes such a rotary distributor. It can be seen that here two positions of this rotary distributor are conceivable.

The plastic preforms are pushed along their longitudinal direction L into the resonator units 2a, 2b, 2c and are also taken out of the resonator units along this longitudinal direction L. Reference 18 denotes a movement device which brings about this movement of the plastic preforms 10 along their longitudinal direction L. It is preferred that each station 20 has such a movement device 18 (for instance in the form of a linear motor). The movement of the plastic preforms 10 relative to the resonator units 2a, 2b, 2c can thus be controlled individually for the individual stations. In addition, as mentioned above, the plastic preforms 10 can also be rotated about this longitudinal direction L.

Figure 3:
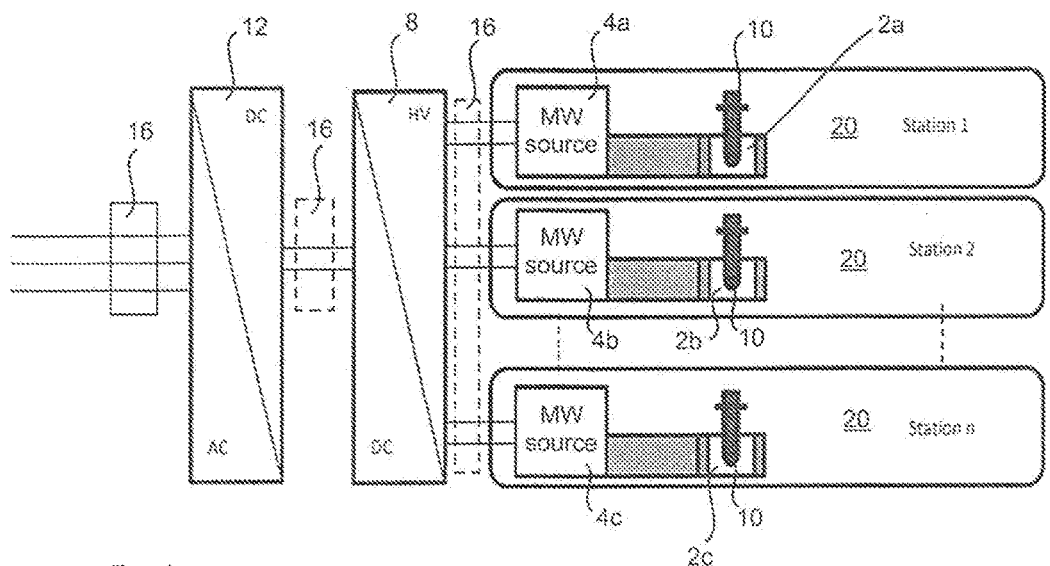
FIG. 3 shows an apparatus according to the invention in a second embodiment.

FIG. 3 shows a further embodiment of an apparatus according to embodiments of the invention. In this embodiment, not only a central rectifier unit is provided, but also a central high voltage source. This central high voltage source supplies each of the individual microwave generating devices 4a, 4b, 4c with high voltage. In this embodiment, a total of three positions of a rotary distributor 16 would be conceivable, two of these positions being respectively shown by the dashed-line rectangles. All the units shown could thus be arranged on the rotating part, but it would also be conceivable that the rectifier unit 12 is arranged centrally and in a stationary manner, as well as the high voltage source 8.

Figure 4:
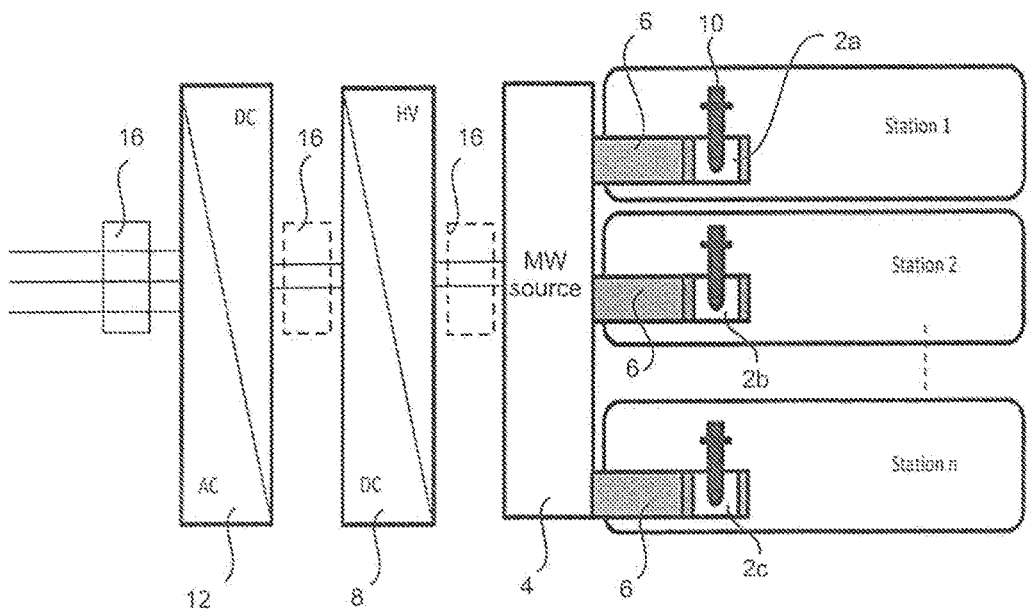
FIG. 4 shows an apparatus according to the invention in a third embodiment.

FIG. 4 shows a further embodiment of the apparatus according to embodiments of the invention. In this embodiment, a central rectifier unit and a central high voltage supply device and a central microwave generating device are provided. This central microwave generating device generates microwaves which are respectively distributed among the individual resonators 2a, 2b and 2c via several waveguides 6. Reference 16 again shows the possible positions of the rotary distributor. Here, too, it would also be conceivable that the high voltage generating device and the microwave generating device are arranged either in a stationary manner or in a movable and/or rotatable manner.

The applicant reserves the right to claim as essential to the invention all the features disclosed in the application documents in so far as these are novel individually or in combination with respect to the prior art. It is also pointed out that also features which may be advantageous individually have been described in the individual figures. A person skilled in the art is immediately aware that a particular feature described in one figure can also be advantageous even without taking further features from this figure. A person skilled in the art is also aware that advantages may also arise through a combination of multiple features shown in individual figures or in different figures.

LIST OF REFERENCES

1 apparatus for heating plastic preforms
2a, b, c resonator units
4a, b, c microwave generating unit
6 feed device, waveguide
8a, b, c high voltage generating unit
10 plastic preform
12 rectifier unit
16 rotary distributor
18 movement device
20 station
L longitudinal direction

The invention claimed is:

1. An apparatus for heating plastic preforms in a process, the apparatus having a plurality of resonator units, into which in each case plastic preforms are introduced in order to heat the latter, having at least one microwave generating unit for generating microwaves, and having at least one feed device for feeding to at least one resonator unit of the plurality of resonator units the microwaves generated by the at least one microwave generating unit, and having at least one rectifier unit for providing a rectified voltage, wherein the at least one rectifier unit provides voltage for operating at least two resonator units of the plurality of resonator units and wherein the plurality of resonator units themselves are arranged in a stationary manner and the individual plastic preforms could in each case be pushed through stationary resonator units and be heated in the process.

2. The apparatus according to claim 1, further comprising a transport device for at least one of introducing the plastic preforms into the plurality of resonator units and for taking the plastic preforms out of the plurality of resonator units.

3. The apparatus according to claim 1, further comprising at least one high voltage generating unit for operating a generator of high frequency voltage.

4. The apparatus according to claim 3, wherein the at least one high voltage generating unit provides high voltage for operating at least two resonator units of the plurality of resonator units.

5. The apparatus according to claim 1, wherein at least one microwave generating device generates microwaves for operating at least two resonator units of the plurality of resonator units.

6. The apparatus according to claim 1, further comprising at least one transport device that transports the plurality of resonator units along a predefined transport path.

7. The apparatus according to claim 1, wherein the at least one microwave generating unit is selected from a group of microwave generating units which includes magnetrons, klystrons or solid-state sources.

8. The apparatus according to claim 1, wherein the at least one rectifier unit includes a central rectifier unit, and the central rectifier unit and a central high voltage generating unit are arranged which supply all resonator units that are present.

9. The apparatus according to claim 8, wherein the output of the central rectifier unit and the central high voltage generating unit are distributed among the microwave generating units of the individual resonator units.

10. The apparatus according to claim 1, wherein the at least one rectifier unit includes a central rectifier unit, and the central rectifier unit a central high voltage generating unit and a central microwave generating unit are arranged which supply all resonator units that are present and the microwave radiation is distributed among the plurality of resonator units.

11. The apparatus according to claim 10, wherein the rectifier unit is arranged in a stationary manner and the rectified voltage is transmitted to the high voltage generating unit and from the latter to the microwave generating unit and form the latter to the resonator unit.

12. The apparatus according to claim 1, wherein in each of the resonator devices a base reflector is provided which reflects microwave radiation onto the base regions of the plastic preforms.

13. The apparatus according to claim 10, wherein the central microwave generating unit generates from a high voltage the microwave power for the entire system.

14. The apparatus according to claim 1, wherein the at least one rectifier unit is arranged in a stationary manner and the rectified voltage is transmitted to movable resonator units of the plurality of resonator units.

15. The apparatus according to claim 10, wherein the central microwave generating unit is arranged in a movable manner in such a way as to move jointly with the resonator units.

16. The apparatus according to claim 10, wherein the microwave radiation to the individual resonator units is switched on or off via suitable switching devices.

17. The apparatus according to claim 2, wherein the transport device has a rotating device which brings about a rotation of the plastic preforms about their longitudinal axis.

* * * * *

UNITED STATES PATENT AND TRADEMARK OFFICE
CERTIFICATE OF CORRECTION

PATENT NO. : 10,449,695 B2
APPLICATION NO. : 15/095556
DATED : October 22, 2019
INVENTOR(S) : Martin Kammerl et al.

Page 1 of 1

It is certified that error appears in the above-identified patent and that said Letters Patent is hereby corrected as shown below:

In the Claims

Column 8, Line 56-57, delete "wherein the rectifier unit" and insert -- wherein the at least one rectifier unit --

Signed and Sealed this
Sixteenth Day of June, 2020

Andrei Iancu
*Director of the United States Patent and Trademark Office*